United States Patent
Li et al.

(10) Patent No.: US 11,197,233 B2
(45) Date of Patent: Dec. 7, 2021

(54) METHOD FOR SENDING AND ACQUIRING SYSTEM INFORMATION, DEVICE AND COMMUNICATION SYSTEM

(71) Applicant: FUJITSU LIMITED, Kawasaki (JP)

(72) Inventors: Guorong Li, Beijing (CN); Lei Zhang, Beijing (CN); Meiyi Jia, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/891,859

(22) Filed: Jun. 3, 2020

(65) Prior Publication Data

US 2020/0296658 A1 Sep. 17, 2020

Related U.S. Application Data

(63) Continuation of application No. PCT/CN2018/072081, filed on Jan. 10, 2018.

(51) Int. Cl.
| | |
|---|---|
| *H04W 4/00* | (2018.01) |
| *H04W 48/08* | (2009.01) |
| *H04W 68/00* | (2009.01) |
| *H04W 72/04* | (2009.01) |

(52) U.S. Cl.
CPC ......... *H04W 48/08* (2013.01); *H04W 68/005* (2013.01); *H04W 72/04* (2013.01)

(58) Field of Classification Search
USPC .......................... 455/434; 370/328, 329, 330
See application file for complete search history.

(56) References Cited

U.S. PATENT DOCUMENTS

| | | |
|---|---|---|
| 2009/0010219 A1 | 1/2009 | Lee et al. |
| 2013/0308586 A1 | 11/2013 | Yamada et al. |
| 2017/0251500 A1* | 8/2017 | Agiwal ............. H04W 74/0833 |

(Continued)

FOREIGN PATENT DOCUMENTS

| | | |
|---|---|---|
| CN | 102197694 A | 9/2011 |
| CN | 104885513 A | 9/2015 |

(Continued)

OTHER PUBLICATIONS

International Search Report issued by the State Intellectual Property Office of the P.R. China for corresponding International Patent Application No. PCT/CN2018/072081, dated May 30, 2018, with an English translation.

(Continued)

*Primary Examiner* — David Q Nguyen
(74) *Attorney, Agent, or Firm* — Myers Wolin, LLC

(57) ABSTRACT

Methods and apparatuses for transmitting and acquiring system information and a communication system. The apparatus for transmitting system information includes: a first transmitting unit configured to transmit a paging message on a first bandwidth part (BWP), the paging message comprising indication information indicating a system information modification; and a second transmitting unit configured to transmit updated system information on a second BWP; wherein, the first BWP is different from the second BWP. Hence, the paging message and updated system information are transmitted on different BWPs, thereby saving signaling overhead of the system for transmitting the updated system information.

16 Claims, 9 Drawing Sheets

(56) References Cited

U.S. PATENT DOCUMENTS

| | | | | |
|---|---|---|---|---|
| 2019/0059112 | A1* | 2/2019 | Ou | H04W 74/0833 |
| 2019/0132109 | A1* | 5/2019 | Zhou | H04L 5/001 |
| 2019/0132857 | A1* | 5/2019 | Babaei | H04W 72/042 |
| 2019/0150064 | A1* | 5/2019 | Chen | H04W 48/10 370/328 |
| 2019/0150200 | A1* | 5/2019 | Chen | H04W 74/0833 370/329 |
| 2019/0165915 | A1* | 5/2019 | John Wilson | H04L 5/0053 |
| 2020/0267687 | A1* | 8/2020 | Harada | H04W 68/00 |
| 2020/0344723 | A1* | 10/2020 | Babaei | H04L 1/1874 |

FOREIGN PATENT DOCUMENTS

| | | |
|---|---|---|
| GN | 103561062 A | 2/2014 |
| KR | 10-2007-0080556 A | 8/2007 |
| KR | 10-2018-0120038 A | 11/2018 |
| WO | 2009/038429 A2 | 3/2009 |
| WO | 2010/087416 A1 | 8/2010 |
| WO | 2014/110833 A1 | 7/2014 |

OTHER PUBLICATIONS

Written Opinion of the International Searching Authority issued by the State Intellectual Property Office of the P.R. China for corresponding International Patent Application No. PCT/CN2018/072081, dated May 30, 2018, with an English translation.

First Notification of Office Action and Search Report issued by the China National Intellectual Property Administration for corresponding Chinese Patent Application No. 201880076658.7, dated Jan. 6, 2021, with an English translation.

Extended European search report with the supplementary European search report and the European search opinion isued by the European Patent Office for corresponding European Patent Application No. 18900141.5-1218, dated Jun. 24, 2021.

Samsung, "SI Reception in RRC Connected: Bandwidth Part Aspects", Agenda Item: 10.2.3, 3GPP TSG-RAN WG2 Meeting #99bis, R2-1710092, Prague, Czech Republic, Oct. 9-13, 2017.

Huawei et al., "BWP issues for non EN-DC", Agenda Item: 10.2.20, 3GPP TSG-RAN WG2 Meeting #100, R2-1712323, Reno, USA, Nov. 27-Dec. 1, 2017.

Examination Report issued by the Patent Office of India for corresponding Indian Patent Application No. 202037021954, dated Jun. 14, 2021, with an English translation.

Notice of Preliminary Rejection issued by the Korean Intellectual Property Office for corresponding Korean Patent Application No. 10-2020-7016168, dated Sep. 17, 2021, with an English translation.

\* cited by examiner

201 a paging message is transmitted by a network device on a first BWP, the paging message including indication information indicating a system information modification

202 updated system information is transmitted by the network device on a second BWP; wherein, the first BWP is different from the second BWP

METHOD FOR SENDING AND ACQUIRING SYSTEM INFORMATION, DEVICE AND COMMUNICATION SYSTEM

CROSS REFERENCE TO RELATED APPLICATIONS

This application is a continuation application of International Application No. PCT/CN2018/072081, filed on Jan. 10, 2018, the contents of which are incorporated herein by reference.

TECHNICAL FIELD

This disclosure relates to the field of communication technologies, and in particular to a method for sending and acquiring system information, a device for the same and a communication system.

BACKGROUND

In a long term evolution (LTE) system, system information is essential to ensure that a terminal equipment (no matter whether it is in an idle state or a connected state) work properly. The system information may be broadcast by a network side, and only after the terminal equipment side acquires the necessary system information can it perform such procedures as cell selection/reselection, cell handover, service initiation and so on.

Due to changes over time, a network will update the system information according to a current network status. The current LTE system updates the system information by the way of using a modification period (MP). When the network modifies the system information, the network side usually notifies the terminal equipment of the system information change by using a paging message throughout a modification period n, and when the terminal equipment receives the paging message including a system information change indication (systemInfoModification), the terminal equipment determines that the system information will be modified at a boundary of a next modification period. Therefore, the terminal equipment immediately obtains new system information from a start of the next modification period n+1, or for special system information, such as an earthquake and tsunami warning system (ETWS), or a commercial mobile alert system (CMAS), the terminal equipment needs to attempt to read the paging message at each default paging period to check whether an ETWS and/or CMAS notification(s) occur(s).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In a fifth-generation (5G) mobile communication system, such as a new radio (NR) system, a maximum channel bandwidth may possibly reach 400 MHz (i.e. a wide carrier). If a terminal equipment that is wideband capable has been working on the above wide carrier, power consumption will be very large. Therefore, bandwidth part (BWP) is introduced in the 3rd Generation Partnership Project (3GPP), with one of the motivations being to optimize power consumption of a terminal equipment.

It was found by the inventors that in the related art, paging messages and system information are transmitted and received on the same carrier on which the terminal equipment works. With the introduction of BWP, the network side may pre-configure one or more uplink or downlink BWPs, and the terminal equipment may transmit and receive data by using one or at least two of active BWPs therein; however, how to transmit and receive updated system information is not definitely specified in current standards. Due to the large amount of contents of system information, if the updated system information is transmitted on each active BWP of the terminal equipment in the system, large signaling overhead may be produced.

In order to solve the above problems, embodiments of this disclosure provide methods and apparatuses for transmitting and acquiring system information and a communication system, which may save signaling overhead of the system for transmitting the updated system information.

According to a first aspect of the embodiments of this disclosure, there is provided an apparatus for transmitting system information, wherein the apparatus includes:

a first transmitting unit configured to transmit a paging message on a first bandwidth part (BWP), the paging message including indication information indicating a system information modification; and a second transmitting unit configured to transmit updated system information on a second BWP;

wherein, the first BWP is different from the second BWP.

According to a second aspect of the embodiments of this disclosure, there is provided an apparatus for acquiring system information, wherein the apparatus includes:

a first receiving unit configured to receive a paging message on a first BWP, the paging message including indication information indicating a system information modification; and a second receiving unit configured to receive updated system information on a second BWP;

wherein, the first BWP is different from the second BWP.

According to a third aspect of the embodiments of this disclosure, there is provided a method for transmitting system information, wherein the method includes:

transmitting a paging message by a network device on a first BWP, the paging message including indication information indicating a system information modification; and transmitting updated system information on a second BWP;

wherein, the first BWP is different from the second BWP.

According to a fourth aspect of the embodiments of this disclosure, there is provided a method for acquiring system information, wherein the method includes:

receiving a paging message by a terminal equipment on a first BWP, the paging message including indication information indicating a system information modification; and receiving updated system information on a second BWP;

wherein, the first BWP is different from the second BWP.

According to a fifth aspect of the embodiments of this disclosure, there is provided an apparatus for transmitting a system information indication, wherein the apparatus includes:

a sixth transmitting unit configured to transmit BWP configuration information to a terminal equipment, the BWP configuration information including information on at least one BWP configured for the terminal equipment; and a seventh transmitting unit configured to transmit indication information to the terminal equipment, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

According to a sixth aspect of the embodiments of this disclosure, there is provided an apparatus for acquiring a system information indication, wherein the apparatus includes:

a fifth receiving unit configured to receive BWP configuration information transmitted by a network device, the BWP configuration information including information on at least one BWP configured by the network device for a terminal equipment; and a sixth receiving unit configured to receive indication information transmitted by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

According to a seventh aspect of the embodiments of this disclosure, there is provided a method for transmitting a system information indication, including:

transmitting BWP configuration information to a terminal equipment by a network device, the BWP configuration information including information on at least one BWP configured for the terminal equipment; and transmitting indication information to the terminal equipment by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

According to an eighth aspect of the embodiments of this disclosure, there is provided a method for acquiring a system information indication, including:

receiving BWP configuration information transmitted by a network device, the BWP configuration information including information on at least one BWP configured by the network device for a terminal equipment; and receiving indication information transmitted by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

An advantage of the embodiments of this disclosure exists in that the paging message and updated system information are transmitted on different BWPs, thereby saving signaling overhead of the system for transmitting the updated system information.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figures 1, 2:
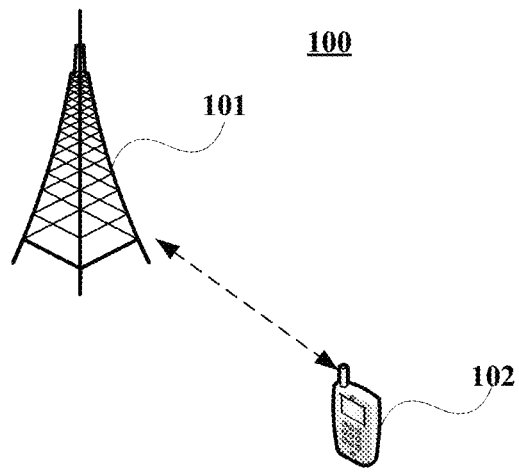
FIG. 1 is a schematic diagram of a communication system of an embodiment of this disclosure.
FIG. 2 is a flowchart of a method for transmitting system information of Embodiment 1 of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and a terminal equipment 102. For the sake of simplicity, description is given in FIG. 1 by taking one terminal equipment and one network device only as an example; however, the embodiments of this disclosure are not limited thereto.

In the embodiment of this disclosure, existing services or services that may be implemented in the future may be performed between the network device 101 and the terminal equipment 102. For example, such services may include but not limited to an enhanced mobile broadband (eMBB), massive machine type communication (MTC), and ultra-reliable and low-latency communication (URLLC).

In the following, the embodiment of this disclosure will be described by taking an NR system as an example. However, this disclosure is not limited thereto, and may also be applied to any system in which similar problems exist.

The embodiments of this disclosure shall be described below with reference to the accompanying drawings.

Embodiment 1

The embodiment of this disclosure provides a method for transmitting system information. FIG. 2 is a flowchart of the method for transmitting system information of this embodiment, which is applicable to a network device side. As shown in FIG. 2, the method includes:

step 201: a paging message is transmitted by a network device on a first BWP, the paging message including indication information indicating a system information modification; and step 202: updated system information is transmitted by the network device on a second BWP; wherein, the first BWP is different from the second BWP.

It can be seen from the above embodiment that the paging message and updated system information are transmitted on different BWPs, which may reduce the number of BWPs transmitting the system information, that is, it is not needed that the updated system information is transmitted on each active BWP of the terminal equipment in the system, thereby saving signaling overhead of the system for transmitting the updated system information.

In this embodiment, the network side may configure a plurality of BWPs for the terminal equipment, and the network device may select one therefrom or another one or at least two BWPs to transmit the system information (such as selecting some BWPs in the plurality of BWPs to transmit the system information). And furthermore, it may select one therefrom or another one or at least two BWPs to transmit the paging message; wherein the one or at least two BWPs transmitting the system information and the one or at least two BWPs transmitting paging message are partially different, or completely different, that is, at least one BWP transmitting the system information is different from at least one BWP transmitting the paging message. Two BWPs being different means that at least center frequency points, or bandwidths, or subcarrier spacings of the two BWPs are different. The BWPs selected to transmit the system information or the paging message may be the BWPs configured for the terminal equipment by the network side, or may be other BWPs, such as BWPs used by the terminal equipment in access, i.e. initial BWPs.

Figure 3:
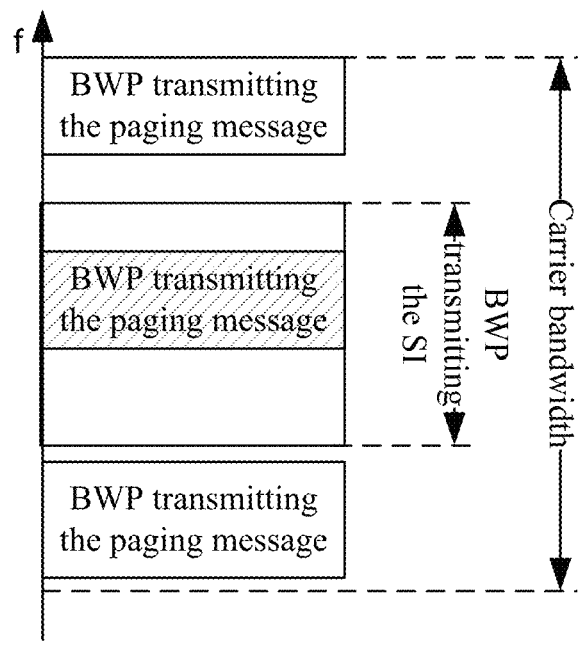
FIG. 3 is a schematic diagram of a BWP of Embodiment 1 of this disclosure.

FIG. 3 is a relationship between the BWP transmitting the system information and the BWP transmitting the paging message in this embodiment. As shown in FIG. 3, the BWP transmitting the system information and the BWP transmitting the paging message coincide only at the position shown by the shaded part in FIG. 3, and do not coincide at other positions, that is, center frequency points and bandwidths thereof are different, i.e. the BWP transmitting the system information and the BWP transmitting the paging message are different.

In this embodiment, when the network device modifies the system information, in step 201, the network device transmits the paging message to the terminal equipment at a first BWP of the one or at least two BWPs transmitting the paging message, the paging message including indication information (systemInfoModification) indicating the modification of system information; wherein the first BWP may be an active BWP; however, this embodiment is not limited thereto.

In this embodiment, after notifying the terminal equipment of the modification of system information, in step 202, the network device transmits updated system information on a second BWP different from the first BWP, and the terminal equipment may switch to the second BWP or activate the second BWP to obtain the updated system information. As the number of BWPs transmitting the system information is reduced, that is, it is not needed that the updated system information is transmitted on each active BWP of the terminal equipment in the system, thereby saving signaling overhead of the system for transmitting the updated system information.

In this embodiment, as described above, the second BWP is different from the first BWP, which means that at least one of the frequency resource information such as the center frequency points, or the bandwidths, or the subcarrier spacings of two BWPs are different. However, it is not specifically limited in this embodiment.

In this embodiment, as described above, the network device may transmit the system information by using one or at least two BWPs. When only one BWP is used to transmit the system information, the one BWP is the second BWP, and when there are at least two BWPs are used to transmit the system information, one of them may be used by the terminal equipment side as the second BWP, or the second BWP may be indicated by the network device.

In one implementation, the second BWP is indicated by the network device, and the method further includes: first indication information is transmitted by the network device to the terminal equipment, the first indication information being used to indicate the second BWP to the terminal equipment, so that the terminal equipment determines the second BWP according to the first indication information, and switches to the second BWP or activates the second BWP to obtain the updated system information.

In one implementation, the terminal equipment uses one of the at least two BWPs used for transmitting the system information as the second BWP, and the method further includes: a first message transmitted by the terminal equipment is received by the network device. The first message is used to indicate the second BWP, and the network device may determine the second BWP according to the first message, and transmit the updated system information on the second BWP. In this implementation, the method further includes: third indication information is transmitted by the network device to the terminal equipment, the third indication information being used to indicate to the terminal equipment the at least two BWPs that transmitting the system information, so that the terminal equipment uses one of the at least two BWPs indicated by the third indication information as the second BWP.

In this embodiment, when the second BWP which transmits the updated system information and is different from the first BWP is determined, the terminal equipment may switch to the second BWP or activate the second BWP to obtain the updated system information. Hence, the method may further include (not shown): a second message transmitted by the terminal equipment is received by the network device, the second message being used to indicate that the terminal equipment switches to the second BWP or the terminal equipment activates the second BWP, that is, the behavior of switch or activation of the terminal equipment is notified to the network device via the second message. The second message may include an objective second BWP of the switch or activation, or may not include an objective second BWP of the switch or activation, and this embodiment is not limited thereto.

In this embodiment, the first indication information, the first message and the second message may be carried by radio resource control (RRC) signaling, or media access control (MAC) signaling, or physical layer signaling; however, this embodiment is not limited thereto.

In this embodiment, as the terminal equipment may switch to the second BWP or activate the second BWP to obtain the updated system information, the method may further include:

step 203 (optional): data is transmitted on the second BWP by the network device.

In this embodiment, when a predetermined triggering condition is satisfied, the terminal equipment may switch to the second BWP or activate the second BWP to obtain the updated system information.

In one implementation, the triggering condition may be determined according to the paging message, that is, the paging message is further used to indicate that the terminal equipment receives the updated system information after a predetermined period of time; and/or the paging message is further used to indicate that the terminal equipment switches to the second BWP or activate the second BWP after a predetermined period of time, and receives the updated system information on the second BWP; wherein, reference may be made to Embodiment 2 for details of behaviors performed by the terminal equipment after the predetermined period of time, which shall not be described herein any further.

In this embodiment, the predetermined period of time may be pre-defined or pre-configured, or may also be indicated by the paging message, such as including configuration information of at least one predetermined period of time in the paging message; wherein when configuration information includes a plurality of predetermined periods of time, the terminal equipment may autonomously select one of the predetermined periods of time, thereby dispersing moments when different terminal equipments switch to the second BWP or activate the second BWP; wherein the predetermined period of time included in the paging message may be identical to or different from a predetermined period of time included in a paging message transmitted on at least one other BWP, and when they are different, the moment when the terminal equipment switches to the second BWP or activates the second BWP may be dispersed.

In one implementation, the triggering condition may be determined via a configuration gap, and the method further includes: terminal equipment gap configuration information is transmitted by the network device to terminal equipment, the gap configuration information including at least one of the following: a period of the gap, an offset of the gap and a duration of the gap, the gap being used for the terminal equipment in switching to the second BWP or activating the second BWP during the gap.

In this embodiment, the triggering condition may have other implementations, which shall be particularly described in Embodiment 2.

It can be seen from the above embodiment that the paging message and updated system information are transmitted on different BWPs, which may save signaling overhead of the system for transmitting the updated system information.

Embodiment 2

The embodiment of this disclosure provides a method for acquiring system information, applicable to a terminal equipment side. As a principle of the method for solving problems is similar to that of the method in Embodiment 1, reference may be made to the implementation of the method in Embodiment 1 for implementation of this method, with identical contents being going to be described herein any further.

Figure 4:
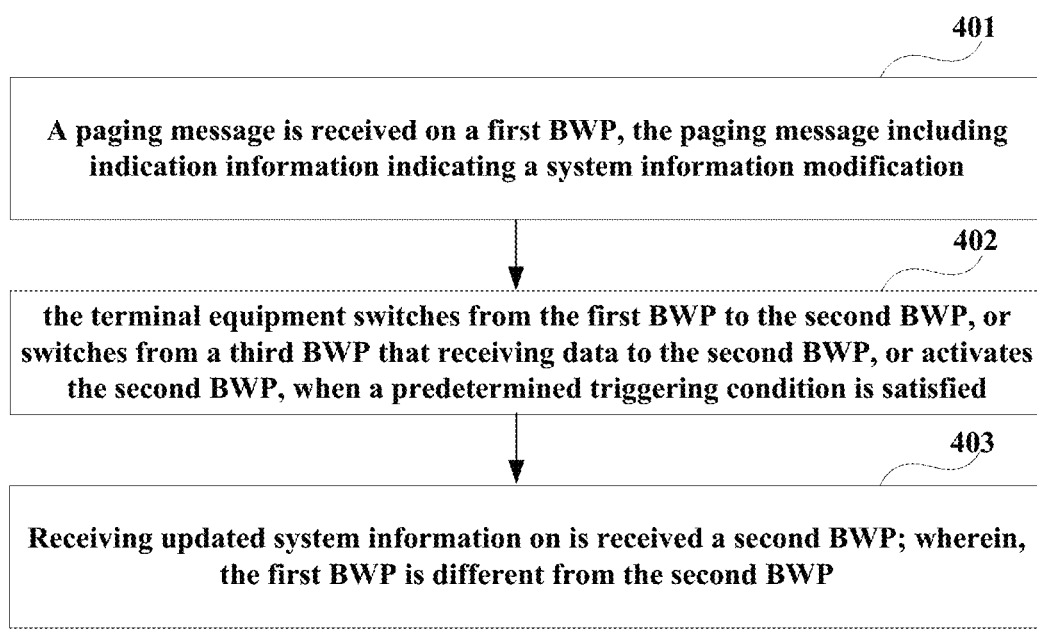
FIG. 4 is a flowchart of a method for acquiring system information of Embodiment 2 of this disclosure.

FIG. 4 is a flowchart of the method for acquiring system information of this embodiment. As shown in FIG. 4, the method includes:

step 401: a paging message is received on a first BWP, the paging message including indication information indicating a system information modification; and step 403: updated system information is received on a second BWP; wherein, the first BWP is different from the second BWP.

It can be seen from the above embodiment that the paging message and updated system information are acquired on different BWPs, which may reduce the number of BWPs transmitting the system information, that is, it is not needed that the updated system information is transmitted on each active BWP of the terminal equipment in the system, thereby saving signaling overhead of the system for transmitting the updated system information.

In this embodiment, reference may be made to Embodiment 1 for particular meanings of the first BWP and the second BWP, and steps 401 and 403 correspond to steps 201 and 202 in Embodiment 1, which shall not be described herein any further.

In this embodiment, as described in Embodiment 1, the network device may transmit the system information by using one or at least two BWPs. When only one BWP is used to transmit the system information, the one BWP is the second BWP. When there are at least two BWPs are used to transmit the system information, one of them may be used by the terminal equipment side as the second BWP, or the second BWP may be indicted by the network device.

In one implementation, the second BWP is indicated by the network device, and the method further includes: r first indication information transmitted by the network device is received by the terminal equipment, the first indication information being used to indicate the second BWP to the terminal equipment, so that the terminal equipment determines the second BWP according to the first indication information, and switches to the second BWP or activates the second BWP to obtain the updated system information.

In one implementation, the terminal equipment uses one of the at least two BWPs used for transmitting the system information as the second BWP, and the method further includes: a first message is transmitted to the network device. The first message is used to indicate the second BWP that is used, and the network device may determine the second BWP according to the first message, and transmit the updated system information on the second BWP. In this implementation, the method further includes: third indication information transmitted by the network device is received, the third indication information being used to indicate to the terminal equipment the at least two BWPs that transmitting the system information, so that the terminal equipment uses one of the at least two BWPs indicated by the third indication information as the second BWP, and switches to the second BWP or activates the second BWP to obtain the updated system information.

In this embodiment, the method may further include:

step 402: the terminal equipment switches from the first BWP to the second BWP, or switches from a third BWP that receiving data to the second BWP, or activates the second BWP, when a predetermined triggering condition is satisfied.

In this embodiment, when the first BWP currently receiving the paging message is an active BWP and the terminal equipment only supports activating one BWP at the same time, it indicates that the terminal equipment is currently transmitting and receiving data on the first BWP, and the terminal equipment switches from the first BWP to the second BWP; or, when the terminal equipment supports simultaneous activating at least two BWPs, the terminal equipment may activate the second BWP; or, when the currently active BWP is not the first BWP but is a third BWP and the terminal equipment only supports simultaneous activating one BWP, it indicates that the terminal equipment is currently transmitting and receiving data on the third BWP, and the terminal equipment may switch from the third BWP to the second BWP; or, when the terminal equipment supports simultaneous activating at least two BWPs, the terminal equipment may activate the second BWP. By switching to the second BWP or activating the second BWP to receive the updated system information, reception and transmission of data by the terminal equipment on an originally active BWP (the first BWP or the third BWP) will not be affected.

In this embodiment, the predetermined triggering condition includes:

a time when the paging message is received; or a time when the paging message is received and a time when a next modification period of the system information comes; or a time when the paging message is received and the paging message further indicates that the terminal equipment receives updated system information after a predetermined period of time; or a time when the paging message is received and after a BWP timer expires; or a time when the paging message is received and during a gap configured for UE by the network device.

The above five triggering conditions shall be described below.

For example, when the triggering condition is the time when the paging message is received, the terminal equipment immediately switches to or activates the second BWP. The triggering condition is applicable to a scenario where the system information is an ETWS/CMAS, that is, the paging message includes notification information scenario indicating an ETWS/CMAS. As the terminal equipment may immediately switch to or activate the second BWP, the updated system information may be obtained in time.

For example, when the triggering condition is the time when the paging message is received and is at a boundary where a next modification period of the system information comes, the terminal equipment switches to or activates the second BWP. As the network side may also be able to learn the boundary of the next modification period of the system information, the BWP of the network side and the terminal equipment will be aligned.

For example, when the triggering condition is the time when the paging message is received and the paging message further indicates that the terminal equipment receives updated system information after a predetermined period of time, the terminal equipment switches to or activates the second BWP, indicating that the terminal equipment immediately switches to or activates the second BWP after the predetermined period of time expires, or that the terminal equipment randomly selects a time autonomously to switch to or activate the second BWP after the predetermined period of time expires, or that the terminal equipment switches to or activates the second BWP within a predetermined period of time after the predetermined period of time expires. What described above are examples only, and this embodiment is not limited thereto.

Under this triggering condition, reference may be made to Embodiment 1 for a particular configuration mode of the predetermined period of time, which shall not be described herein any further. And when the paging message includes configuration information of at least two predetermined periods of time, the terminal equipment may select the predetermined period of time therefrom, thereby dispersing moments of the terminal equipment when it autonomously switches or activates.

For example, when the triggering condition is that the paging message is received and the BWP timer expires, the terminal equipment switches to or activates the second BWP. Under this triggering condition, the second BWP may be a default BWP; however, this embodiment is not limited thereto. The expiration of the timer indicates transmission and reception of the data are finished, and the terminal equipment may switch to or activate the second BWP to receive the updated system message, which may ensure transmission and reception of existing data on the active BWP and energy consumption may also be saved. In this embodiment, the timer may be a BWP inactivity timer BWP-InactivityTimer, and the terminal equipment starts or restarts the timer when it receives a downlink allocation scheduled by the network side. However, this is an example only, and this embodiment is not limited thereto, and the timer may also be started or restarted via other signaling or other events.

For example, when the triggering condition is the time when the paging message is received and during a gap configured for UE by the network device, the terminal equipment switches to or activates the second BWP, and may receive the updated system information on the second BWP within the gap, and the network device will not schedule the terminal equipment on the active BWP, such as the first BWP or the third BWP, within this gap. Under this triggering condition, the terminal equipment receives the gap configuration information transmitted by the network device, the gap configuration including at least one of the following: a period of the gap, an offset of the gap and a duration of the gap. For example, the period of the gap may be configured as being 40 ms, the offset may be configured as being any one of 0 to 39 ms, such as 1 ms, and the duration may be configured as being 6 ms. In this case, the terminal equipment starts to switch to or activate the second BWP at a first 1 ms in every 40 ms, receives the updated system information on the second BWP, with a reception time being 6 ms, and stops receiving the updated system information on the second BWP at a 7th ms every 40 ms. What described above are examples only, and this embodiment is not limited thereto. For example, when the gap configuration information includes only a period, the updated system information may be received in the entire period.

In this embodiment, after switching to the second BWP or activating the second BWP in step 402, step 403 is executed, in which the terminal equipment receives the updated system information on the second BWP.

In this embodiment, after the terminal equipment obtains the updated system message on the second BWP, the method may further include (optional, not shown): the terminal equipment modifies the active BWP to the first BWP or the third BWP or deactivates the second BWP, or stays at the second BWP. For example, the terminal equipment may immediately autonomously modify the active BWP to the first BWP or the third BWP or deactivate the second BWP, or, autonomously modify the active BWP to the first BWP or the third BWP or deactivate the second BWP when the gap configured by the network device comes to an end, or, autonomously modify the active BWP to the first BWP or the third BWP or deactivate the second BWP at a boundary of a next system information modification period, or stays at the second BWP, or, autonomously deactivate the second BWP after receiving the indication of the network device or the BWP timer expires.

Figure 5:
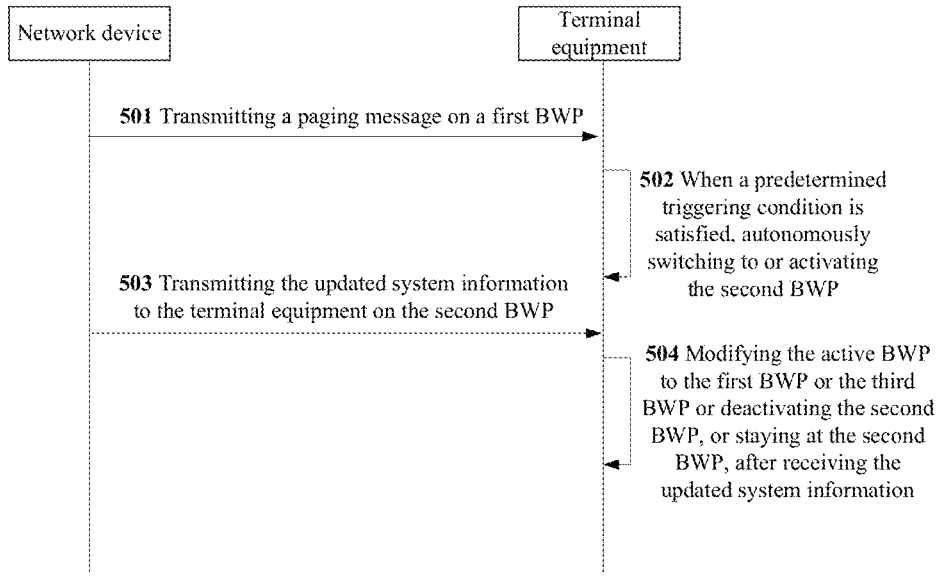
FIG. 5 is a flowchart of a method for receiving and transmitting system information of Embodiment 2 of this disclosure.

FIG. 5 is a flowchart of a method for receiving and transmitting system information of this embodiment. As shown in FIG. 5, the method includes:

step 501: the network device transmits a paging message on a first BWP, the paging message including indication information indicating a system information modification; wherein reference may be made to step 201 in Embodiment 1 for a particular implementation;

step 502, the terminal equipment receives the paging message on the first BWP, and when a predetermined triggering condition is satisfied, autonomously switches to or activates the second BWP;

step 503: the network device transmits the updated system information to the terminal equipment on the second BWP; and step 504: the terminal equipment modifies the active BWP to the first BWP or the third BWP or deactivates the second BWP, or stays at the second BWP after receiving the updated system information.

It can be seen from the above embodiment that the paging message and updated system information are transmitted on different BWPs, which may save signaling overhead of the system for transmitting the updated system information.

Embodiment 3

Figure 6:
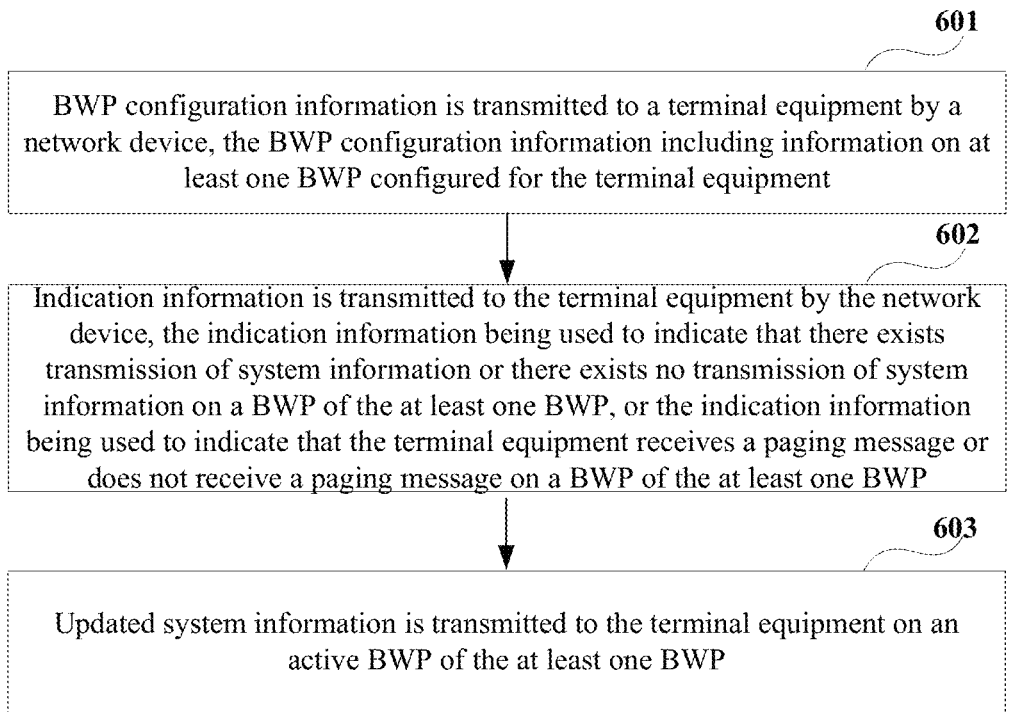
FIG. 6 is a flowchart of a method for transmitting system information indication of Embodiment 3 of this disclosure.

The embodiment of this disclosure provides a method for transmitting a system information indication. FIG. 6 is a flowchart of the method for transmitting a system information indication of this embodiment, which is applicable to a network device side. As shown in FIG. 6, the method includes:

step 601: BWP configuration information is transmitted to a terminal equipment by a network device, the BWP configuration information including information on at least one BWP configured for the terminal equipment; and step 602: indication information is transmitted to the terminal equipment by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

In this embodiment, the network device may notify the terminal equipment of whether system information is transmitted on a BWP of the at least one BWP configured for it, or whether a paging message is received on a BWP of the at least one BWP, and the terminal equipment may, according to the notification, determine not to receive the paging message when there is no transmission of system information on the active BWP, thereby saving overhead of signaling.

In this embodiment, the terminal equipment may be a terminal equipment in a connected state.

In this embodiment, the network device may configure at least one BWP for the terminal equipment, the BWP may be an uplink or downlink BWP, and this embodiment is not limited thereto. In step 601, the network device may transmit configuration information including information on at the least one BWP to the terminal equipment, wherein the information on the at least one BWP may include that:

in one embodiment, the indication information is used to indicate whether there exists transmission of system information or there exists no transmission of system information on a BWP of the at least one BWP; for example, the indication information is used to indicate whether there exists transmission of system information on each of the at least one BWP; wherein the indication information may be a bitmap, a bit length of the bitmap being equal to the number of BWPs configured for the terminal equipment by the network side, and each bit of the bitmap being used to indicate whether there exists transmission of system information in each BWP; and wherein a bit value 1 may be used to indicate that there exists transmission of system information, and a bit value 0 may be used to indicate that there exists no transmission of system information; for example, the indication information is used to indicate a BWP having transmission of system information in the at least one BWP, that is, an index of the BWP having transmission of system information or other related information may be included in the indication information, and a BWP not included in the indication information indicates that it has no transmission of system information; for example, the indication information is used to indicate a BWP having no transmission of system information in the at least one BWP, that is, the index of the BWP having no transmission of system information or other related information may be included in the indication information, and a BWP not included in the indication information indicates that it has transmission of system information thereon. What described above are examples only, and this embodiment is not limited thereto.

In one implementation, the indication information is used to indicate that the terminal equipment receives a paging message or does not receive a paging message on a BWP of the at least one BWP; for example, the indication information is used to indicate a paging message is received or not received on each of the at least one BWP; wherein the indication information may be a bitmap, a bit length of the bitmap being equal to the number of BWPs configured by the network side for the terminal equipment, and each bit of the bitmap being used to indicate whether a paging message is received on each BWP; wherein a bit value 1 may be used to indicate that a paging message is received, and a bit value 0 may be used to indicate that a paging message is not received; for example, the indication information is used to indicate a BWP receiving a paging message in the at least one BWP, that is, an index or of the BWP receiving a paging message or other related information may be included in the indication information, and a BWP not included in the indication information indicates that no paging message is received thereon; for example, the indication information is used to indicate the BWP not receiving the paging message in the at least one BWP, that is, an index of the BWP not receiving the paging message or other related information may be included in the indication information, and a BWP not included in the indication information indicates that a paging information is received thereon. What described above are examples only, and this embodiment is not limited thereto.

In this embodiment, the configuration information and the indication information in step 601 and step 602 may be transmitted in one message, or may be transmitted in different messages at the same time, or may be transmitted separately, and this embodiment is not limited thereto. For example, the configuration information or the indication information may be transmitted via radio resource control signaling or media access control signaling.

In this embodiment, that the indication information indicates that there exists transmission of system information on an active BWP correspondingly indicates that the terminal equipment receives a paging message on the BWP, and that the indication information indicates that there is no transmission of system information on an active BWP correspondingly indicates that the terminal equipment does not receive a paging message on the BWP. And reference may be made to Embodiment 4 for particular implementation thereof, which shall not be described herein any further.

In this embodiment, when the system information is modified, the method further includes:

step 603: updated system information is transmitted to the terminal equipment on an active BWP of the at least one BWP, wherein the updated system information may be transmitted via radio resource control signaling.

In this embodiment, when there is no transmission of system information on the active BWP or when the terminal equipment does not receive a paging message on the active BWP, step 603 is executed by the network device, that is, transmitting the updated system information on the active BWP, thereby saving overhead of signaling.

It can be seen from the above embodiment that the network device may notify the terminal equipment of whether there exists transmission of system information on a BWP of the at least one BWP configured for the terminal equipment or whether a paging message is received on a BWP of the at least one BWP, and according to the notification, the terminal equipment may determine not to receive a paging message when there exists no transmission of system information on the active BWP, thereby saving overhead of signaling.

Embodiment 4

The embodiment of this disclosure provides a method for acquiring a system information indication, applicable to a terminal equipment side. As a principle of the method for solving problems is similar to that of the method in Embodiment 3, reference may be made to the implementation of the method in Embodiment 3 for implementation of this method, with identical contents being going to be described herein any further.

Figure 7:
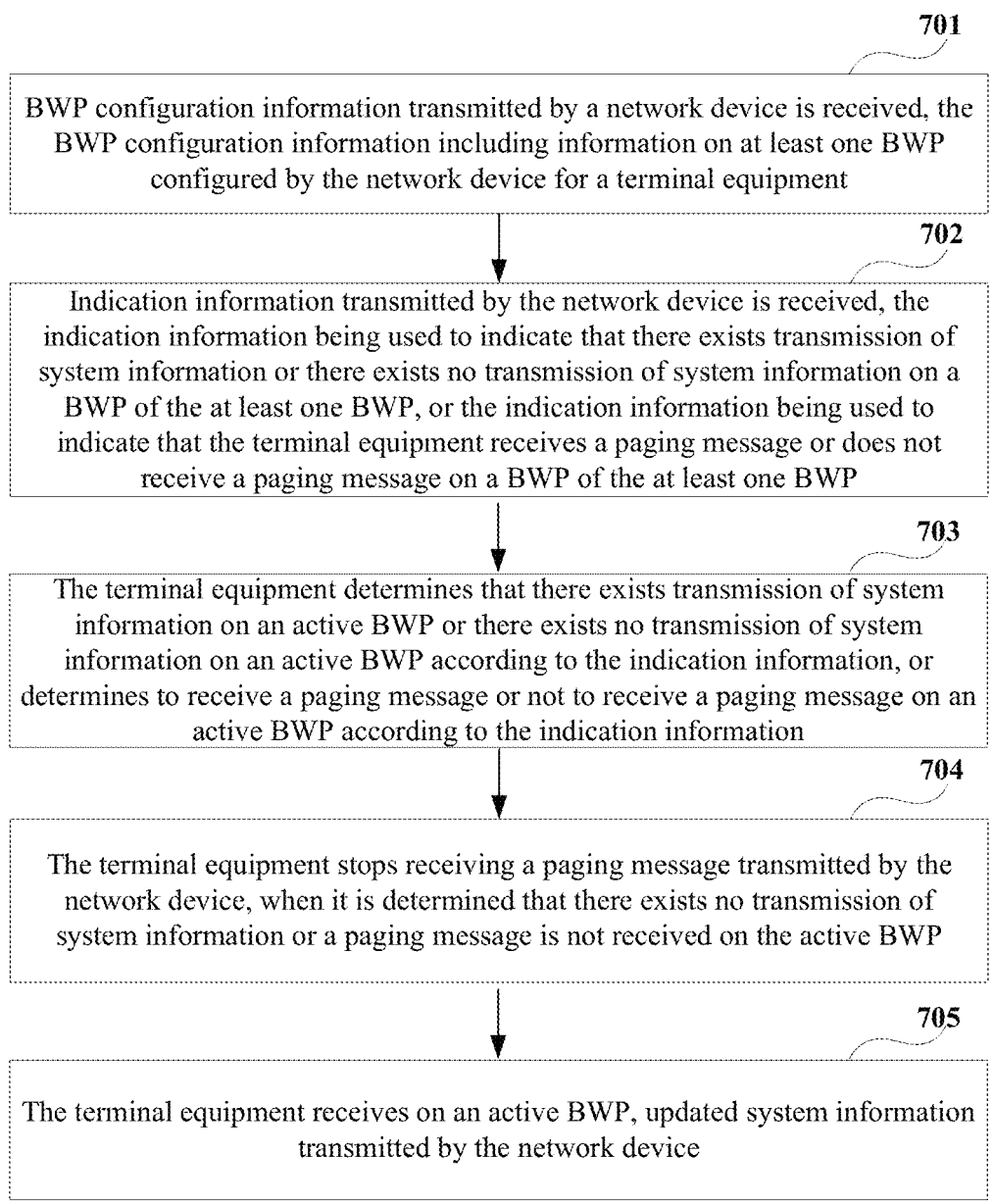
FIG. 7 is a flowchart of a method for acquiring system information indication of Embodiment 4 of this disclosure.

FIG. 7 is a flowchart of the method for acquiring a system information indication of this embodiment. As shown in FIG. 7, the method includes:

step 701: BWP configuration information transmitted by a network device is received by a terminal equipment, the BWP configuration information including information on at least one BWP configured by the network device for a terminal equipment; and step 702: indication information transmitted by the network device is received by the terminal equipment, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

In this embodiment, implementations of steps 701-702 correspond to steps 601-602 in Embodiment 3, and reference may be made to Embodiment 3 for implementations thereof, which shall not be described herein any further.

In this embodiment, reference may be made to Embodiment 3 for particular implementations of the configuration information and the indication information, which shall not be described herein any further.

In this embodiment, the method may further include:

step 703: the terminal equipment determines that there exists transmission of system information on an active BWP or there exists no transmission of system information on an active BWP according to the indication information, or determines to receive a paging message or not to receive a paging message on an active BWP according to the indication information; and step 704: the terminal equipment stops receiving a paging message transmitted by the network device (does not receive a paging message), when it is determined that there exists no transmission of system information or a paging message is not received on the active BWP.

In this embodiment, as there exists no transmission of system information on the active BWP, the terminal device does not need to receive the paging message; and when the system information is modified, the terminal device does not need to obtain an indication on modification of the system information via the paging message, and the network side may directly transmit the updated system message to the terminal device, so that the terminal device updates the system information. Hence, in this embodiment, when the system information is modified, the method further includes:

step 705: the terminal equipment receives on an active BWP, updated system information transmitted by the network device. The updated system information may be transmitted via radio resource control signaling; however, this embodiment is not limited thereto.

In this embodiment, the terminal equipment replaces stored corresponding system information with the updated system information.

Figure 8:
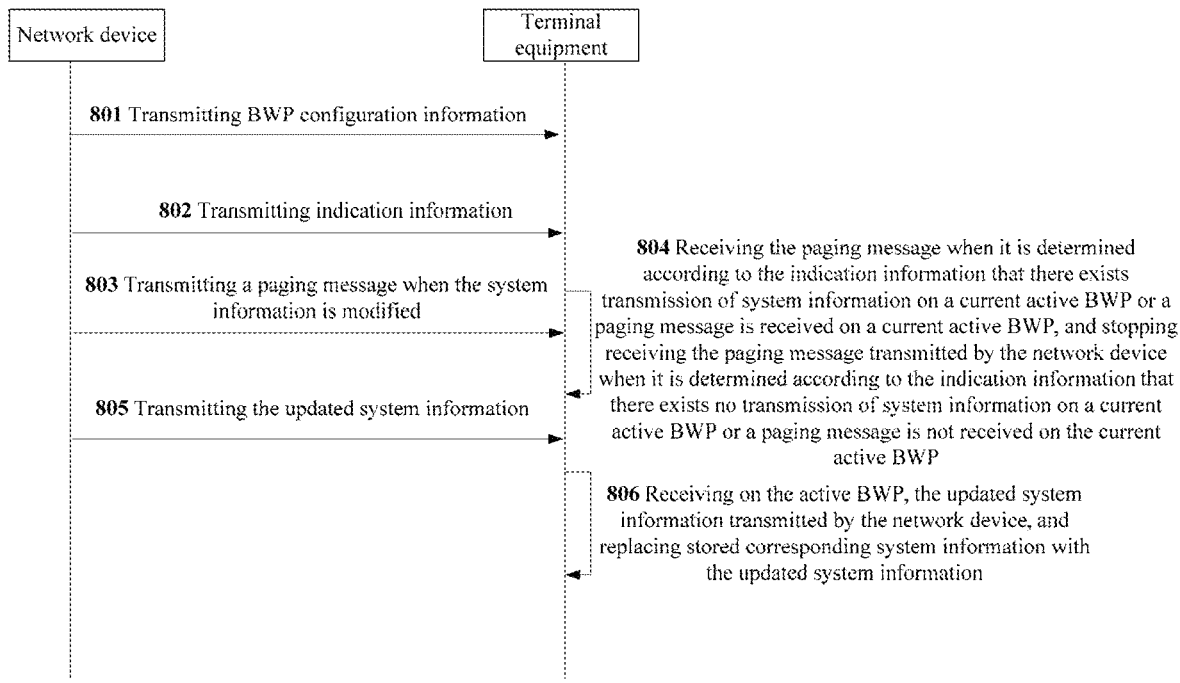
FIG. 8 is a flowchart of a method for receiving and transmitting a system information indication of Embodiment 4 of this disclosure.

FIG. 8 is a flowchart of a method for receiving and transmitting a system information indication of this embodiment. As shown in FIG. 8, the method includes:

step 801: a network device transmits BWP configuration information to a terminal equipment, the BWP configuration information including information on at least one BWP configured for the terminal equipment; and step 802: the network device transmits indication information to the terminal equipment by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP;

wherein, steps 801-802 correspond to steps 601-602, and repeated parts thereof shall not be described herein any further;

step 803: the network device transmits a paging message when the system information is modified, the paging message including indication information indicating modification of the system information;

step 804: the terminal equipment receives the paging message transmitted by the network device when the terminal equipment determines according to the indication information that there exists transmission of system information on the current active BWP or a paging message is received on a current active BWP, and stops receiving the paging message transmitted by the network device when the terminal equipment determines according to the indication information that there exists no transmission of system information on the current active BWP or a paging message is not received on the current active BWP;

in this embodiment, in step 801, when the network device configures BWPs for the terminal equipment, one of the BWPs may be activated at the same time, and as demanded by service, the network device may instruct the terminal device via signaling to modify the active BWP, and this embodiment is not limited thereto; hence, the current active BWP may be any BWP configured by the network device for the terminal equipment;

step 805: the network device transmits the updated system information on the active BWP to the terminal equipment; and step 806: the terminal equipment receives on the active BWP, the updated system information transmitted by the network device, and replaces stored corresponding system information with the updated system information.

It can be seen from the above embodiment that the network device may notify the terminal equipment of whether there exists transmission of system information on a BWP of the at least one BWP configured for the terminal equipment or whether a paging message is received on a BWP of the at least one BWP, and according to the notification, the terminal equipment may determine not to receive a paging message when there exists no transmission of system information on the active BWP, thereby saving overhead of signaling.

Embodiment 5

Embodiment 5 provides an apparatus for transmitting system information. As a principle of the apparatus for solving problems is similar to that of the method in Embodiment 1, reference may be made to the implementation of the method in Embodiment 1 for implementation of the apparatus, with identical contents being not going to be described herein any further.

Figure 9:
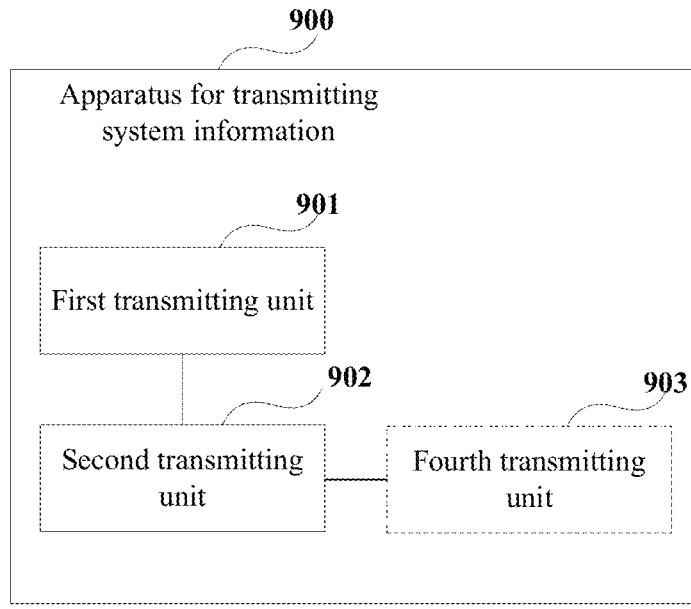
FIG. 9 is a schematic diagram of an apparatus for transmitting system information of Embodiment 5 of this disclosure.

FIG. 9 is a schematic diagram of the apparatus for transmitting system information of Embodiment 5 of this disclosure. As shown in FIG. 9, an apparatus 900 for transmitting system information includes:

a first transmitting unit 901 configured to transmit a paging message on a first BWP, the paging message including indication information indicating a system information modification; and a second transmitting unit 902 configured to transmit updated system information on a second BWP;

wherein, the first BWP is different from the second BWP.

In this embodiment, reference may be made to steps 210-202 in Embodiment 1 for particular implementations of the first transmitting unit 901 and the second transmitting unit 902, and repeated parts thereof shall not be described herein any further; wherein reference may be made to Embodiment 1 for meanings of the first BWP and the second BWP, which shall not be described herein any further.

In this embodiment, the apparatus may further include:

a third transmitting unit (optional, not shown) configured to transmit first indication information to a terminal equipment, the first indication information being used to indicate the second BWP.

In this embodiment, the apparatus may further include:

a first message receiving unit (optional, not shown) configured to receive a first message transmitted by the terminal equipment, the first message being used to indicate the second BWP.

In this embodiment, the apparatus may further include:

a second message receiving unit (optional, not shown) configured to receive a second message transmitted by the terminal equipment, the second message being used to indicate that the terminal equipment switches to the second BWP or the terminal equipment activates the second BWP.

In this embodiment, the apparatus may further include:

a fourth transmitting unit 903 (optional) configured to, on the second BWP, transmit data.

In this embodiment, the paging message is further used to indicate that the terminal equipment receives the updated system information after a predetermined period of time, wherein the predetermined period of time is indicated by the paging message, or the predetermined period of time is predefined or preconfigured.

In this embodiment, the paging message is further used to indicate that the terminal equipment switches to the second BWP or actives the second BWP after the predetermined period of time and receives the updated system information on the second BWP.

In this embodiment, the predetermined period of time contained in the paging message is different from or identical to a predetermined period of time contained in a paging message transmitted on at least one other BWP.

In this embodiment, the apparatus may further include:

a fifth transmitting unit (optional, not shown) configured to transmit terminal equipment gap configuration information to the terminal equipment, the gap configuration information including at least one of the following: a period of the gap, an offset of the gap and a duration of the gap, the gap being used for the terminal equipment in switching to the second BWP or activating the second BWP during the gap.

In this embodiment, reference may be made to Embodiment 1 for particular implementations of the units, which shall not be described herein any further.

It can be seen from the above embodiment that the paging message and updated system information are transmitted on different BWPs, which may save signaling overhead of the system for transmitting the updated system information.

Embodiment 6

The embodiment of this disclosure provides a network device. As a principle of the device for solving problems is similar to that of the method in Embodiment 1, reference may be made to the implementation of the method in Embodiment 1 for implementation of the device, with identical contents being not going to be described herein any further.

The embodiment of this disclosure further provides a network device (not shown), configured with the apparatus 900 for transmitting system information.

Figure 10:
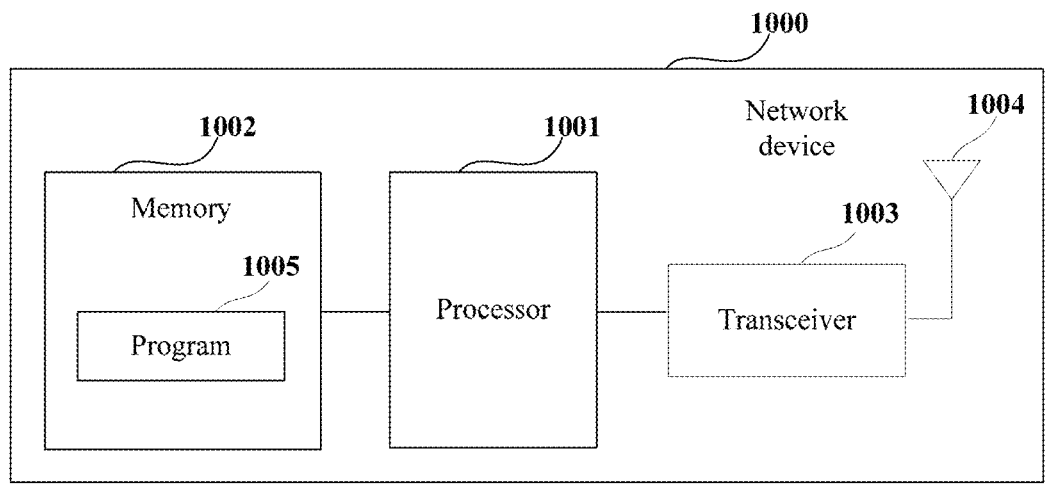
FIG. 10 is a schematic diagram of a structure of a network device of Embodiment 6 of this disclosure.

Embodiment 10 further provides a network device. As a principle of the device for solving problems is similar to that of the method in Embodiment 1, reference may be made to the implementation of the method in Embodiment 1 for implementation of the device, with identical contents being not going to be described herein any further. FIG. 10 is a schematic diagram of a structure of the network device. As shown in FIG. 10, a network device 1000 may include a central processing unit (CPU) 1001 and a memory 1002, the memory 1002 being coupled to the central processing unit 1001. The memory 1002 may store various data, and furthermore, it may store a program 1005 for data processing, and execute the program under control of the central processing unit 1001, to transmit system information.

In one implementation, the functions of the apparatus 900 may be integrated into the central processing unit 1001, wherein the central processing unit 1001 may be configured to carry out the method for transmitting system information described in Embodiment 1.

For example, the central processing unit 1001 may be configured to: transmit a paging message on a first BWP, the paging message including indication information indicating a system information modification; and transmit updated system information on a second BWP; wherein, the first BWP is different from the second BWP.

For example, the central processing unit 1001 may further be configured to: transmit first indication information to a terminal equipment, the first indication information being used to indicate the second BWP.

For example, the central processing unit 1001 may further be configured to: receive a first message transmitted by the terminal equipment, the first message being used to indicate the second BWP.

For example, the central processing unit 1001 may further be configured to: receive a second message transmitted by the terminal equipment, the second message being used to indicate that the terminal equipment switches to the second BWP or the terminal equipment activates the second BWP.

For example, the central processing unit 1001 may further be configured to: on the second BWP, transmit data.

In one implementation, the paging message is further used to indicate that the terminal equipment receives the updated system information after a predetermined period of time; wherein the predetermined period of time is indicated by the paging message, or the predetermined period of time is predefined or preconfigured.

In one implementation, the paging message is further used to indicate that the terminal equipment switches to the second BWP or actives the second BWP after the predetermined period of time and receive the updated system information on the second BWP.

In this embodiment, the predetermined period of time contained in the paging message is different from or identical to a predetermined period of time contained in a paging message transmitted on at least one other BWP.

For example, the central processing unit 1001 may further be configured to: transmit terminal equipment gap configuration information to the terminal equipment, the gap configuration information including at least one of the following: a period of the gap, an offset of the gap and a duration of the gap, the gap being used for the terminal equipment in switching to the second BWP or activating the second BWP during the gap.

Furthermore, reference may be made to Embodiment 1 for a particular configuration mode of the central processing unit 1001, which shall not be described herein any further.

In another implementation, the above apparatus 900 and the central processing unit 1001 may be configured separately; for example, the apparatus 900 may be configured as a chip connected to the central processing unit 1001, such as the units shown in FIG. 10, and the functions of the apparatus 900 are executed under control of the central processing unit 1001.

Furthermore, as shown in FIG. 10, the network device 1000 may include a transceiver 1003, and an antenna 1004, etc. Functions of the above components are similar to those in the related art, and shall not be described herein any further. It should be noted that the network device 1000 does not necessarily include all the parts shown in FIG. 10. Furthermore, the network device 1000 may include parts not shown in FIG. 10, and the related art may be referred to.

It can be seen from the above embodiment that the paging message and updated system information are transmitted on different BWPs, which may save signaling overhead of the system for transmitting the updated system information.

Embodiment 7

Embodiment 7 provides an apparatus for acquiring system information. As a principle of the apparatus for solving problems is similar to that of the method in Embodiment 2, reference may be made to the implementation of the method in Embodiment 2 for implementation of the apparatus, with identical contents being not going to be described herein any further.

Figure 11:
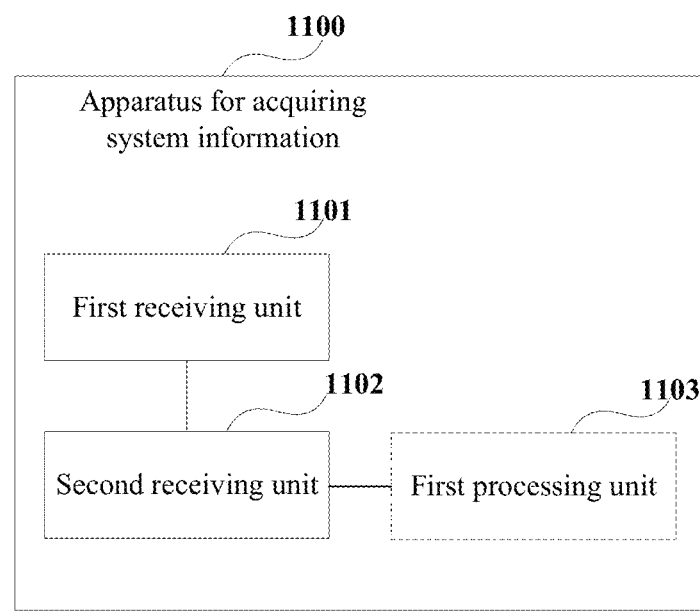
FIG. 11 is a schematic diagram of an apparatus for acquiring system information of Embodiment 7 of this disclosure.

FIG. 11 is a schematic diagram of the apparatus for acquiring system information of Embodiment 7 of this disclosure. As shown in FIG. 11, an apparatus 1100 for acquiring system information includes:

a first receiving unit 1101 configured to receive a paging message on a first BWP, the paging message including indication information indicating a system information modification; and a second receiving unit 1102 configured to receive updated system information on a second BWP;

wherein, the first BWP is different from the second BWP.

In this embodiment, reference may be made to steps 401 and 403 in Embodiment 2 for particular implementations of the first receiving unit 1101 and the second receiving unit 1102, and repeated parts thereof shall not be described herein any further; wherein reference may be made to Embodiment 1 for meanings of the first BWP and the second BWP, which shall not be described herein any further.

In this embodiment, the apparatus may further include:

a first processing unit 1103 configured to switch from the first BWP to the second BWP, or switch from a third BWP receiving data to the second BWP, or activate the second BWP, when a predetermined triggering condition is satisfied.

In this embodiment, the second receiving unit 1102 receives the updated system information on the second BWP after the first processing unit 1103 switches to the second BWP or actives the second BWP.

In this embodiment, the apparatus may further include:

a determining unit (optional, not shown) configured to determine the second BWP, including determining by the determining unit a second BWP to be used from at least two second BWPs used by a network device in transmitting updated system information;

or the apparatus may further include:

a third receiving unit (optional, not shown) configured to receive first indication information transmitted by a network device, the first indication information being used to indicate the second BWP to the terminal equipment; and the determining unit determines the second BWP to be used according to the first indication information.

In this embodiment, the apparatus may further include:

a second processing unit (optional, not shown) configured to modify an active BWP into the first BWP or the third BWP or deactivate the second BWP, after system information is received on the second BWP;

or modify an active BWP into the first BWP or the third BWP or deactivate the second BWP, when a gap configured by the network device comes to an end;

or modify an active BWP into the first BWP or the third BWP or deactivate the second BWP, at a boundary of a next modification period of the system information;

or stay on the second BWP;

or deactivate the second BWP after indication is received from the network device or a BWP timer expires.

In this embodiment, the predetermined triggering condition includes:

a time when the paging message is received; or a time when the paging message is received and at a boundary where a next modification period of the system information comes; or a time when the paging message is received and the paging message further indicates that the terminal equipment receives updated system information after a predetermined period of time; or a time when the paging message is received and after a BWP timer expires; or a time when the paging message is received and during a gap configured for UE by the network device.

For example, when the paging message includes a notification message indicating that the system information is ETWS/CMAS, the predetermined triggering condition is the time when the paging message is received.

For example, the terminal equipment selects the predetermined period of time from at least one predetermined period when the predetermined triggering condition is the time when the paging message is received and the paging message further indicates that the terminal equipment receives the updated system information after the predetermined period of time and the terminal equipment has information on one or at least two predetermined periods of time.

For example, when the predetermined condition is the time when the paging message is received and during a gap configured for UE by the network device, the apparatus further includes:

a fourth receiving unit (optional, not shown) configured to receive gap configuration information transmitted by the network device, the gap configuration information including at least one of the following: a period of the gap, an offset of the gap, and a duration of the gap.

In this embodiment, the apparatus may further include:

a first message transmitting unit (optional, not shown) configured to transmit a first message to the network device, the first message being used to indicate the second BWP; and/or a second message transmitting unit (optional, not shown) configured to transmit a second message to the network device, the second message being used to indicate that the terminal equipment switches to the second BWP or the terminal equipment activates the second BWP.

It can be seen from the above embodiment that the paging message and updated system information are transmitted on different BWPs, which may save signaling overhead of the system for transmitting the updated system information.

Embodiment 8

The embodiment of this disclosure provides a terminal equipment. As a principle of the equipment for solving problems is similar to that of the method in Embodiment 2, reference may be made to the implementation of the method in Embodiment 2 for implementation of the device, with identical contents being not going to be described herein any further.

The embodiment of this disclosure further provides a terminal equipment (not shown), configured with the apparatus 1100 for acquiring system information described above.

Figure 12:
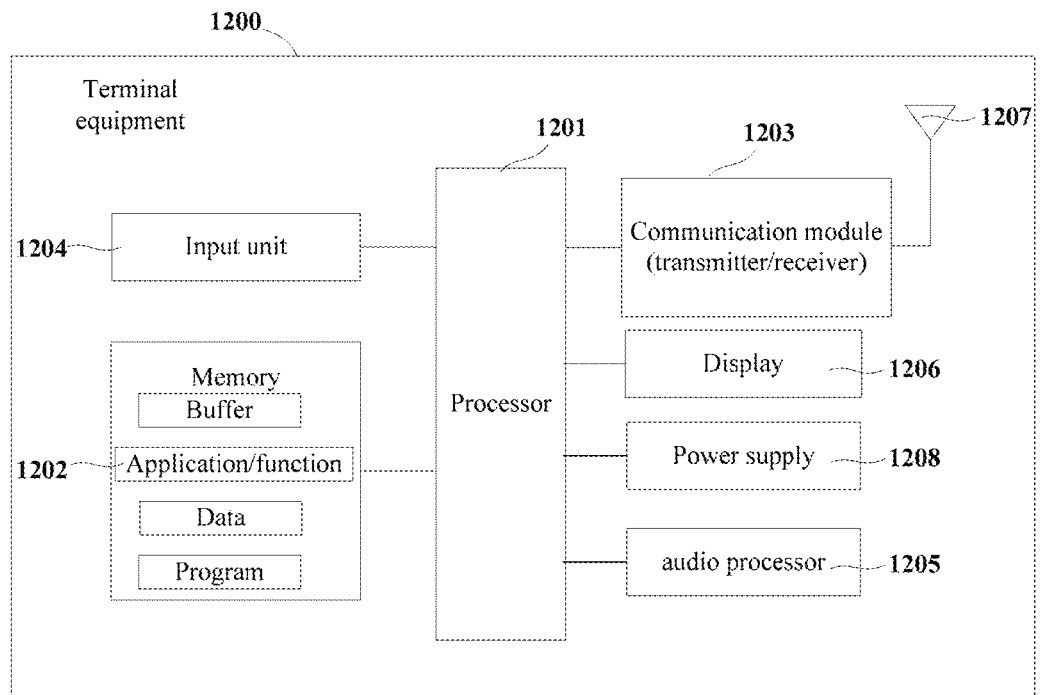
FIG. 12 is a schematic diagram of a structure of terminal equipment of Embodiment 8 of this disclosure.

This embodiment further provides a terminal equipment. FIG. 12 is a schematic diagram of a structure of the terminal equipment. As shown in FIG. 12, a terminal equipment 1200 may include a central processing unit (CPU) 1201 and a memory 1202, the memory 1202 being coupled to the central processing unit 1201. The memory 1202 may store various data, and furthermore, it may store a program for data processing, and execute the program under control of the central processing unit 1201, so as to acquire system information indication.

In one implementation, the functions of the apparatus 1100 may be integrated into the central processing unit 1201, wherein the central processing unit 1201 may be configured to carry out the method for acquiring system information described in Embodiment 2.

For example, the central processing unit 1201 may be configured to: receive a paging message on a first BWP, the paging message including indication information indicating a system information modification; and receive updated system information on a second BWP; wherein, the first BWP is different from the second BWP.

For example, the central processing unit 1201 may further be configured to: switch from the first BWP to the second BWP, or switch from a third BWP receiving data to the second BWP, or activate the second BWP, when a predetermined triggering condition is satisfied.

For example, the central processing unit 1201 may further be configured to: receive the updated system information on the second BWP after switching to the second BWP or activating the second BWP.

For example, the central processing unit 1201 may further be configured to: determine the second BWP, such as determining a second BWP to be used from at least two second BWPs used by a network device in transmitting updated system information; or receive first indication information transmitted by a network device, the first indication information being used to indicate the second BWP to the terminal equipment, and the terminal equipment determines the second BWP to be used according to the first indication information.

For example, the central processing unit 1201 may further be configured to: modify an active BWP into the first BWP or the third BWP or deactivate the second BWP, after system information is received on the second BWP; or modify an active BWP into the first BWP or the third BWP or deactivate the second BWP, when a gap configured by the network device comes to an end; or modify an active BWP into the first BWP or the third BWP or deactivate the second BWP, at a boundary of a next modification period of the system information; or stay on the second BWP; or deactivate the second BWP after indication is received from the network device or a BWP timer expires.

In this embodiment, the predetermined triggering condition includes:

a time when the paging message is received; or a time when the paging message is received and at a boundary where a next modification period of the system information comes; or a time when the paging message is received and the paging message further indicates that the terminal equipment receives updated system information after a predetermined period of time; or a time when the paging message is received and after a BWP timer expires; or a time when the paging message is received and during a gap configured for UE by the network device.

When the paging message includes a notification message indicating that the system information is ETWS/CMAS, the predetermined triggering condition is the time when the paging message is received.

For example, when the predetermined triggering condition is the time when the paging message is received and the paging message further indicates that the terminal equipment receives the updated system information after the predetermined period of time, the central processing unit 1201 may further be configured to: select the predetermined period of time from at least one predetermined period when the terminal equipment has information on one or at least two predetermined periods of time.

For example, when the predetermined condition is the time when the paging message is received and during a gap configured for UE by the network device, the central processing unit 1201 may further be configured to: receive gap configuration information transmitted by the network device, the gap configuration information including at least one of the following: a period of the gap, an offset of the gap, and a duration of the gap.

For example, the central processing unit 1201 may be configured to: transmit a first message to the network device, the first message being used to indicate the second BWP; and/or, transmit a second message to the network device, the second message being used to indicate that the terminal equipment switches to the second BWP or the terminal equipment activates the second BWP.

Furthermore, reference may be made to Embodiment 2 for other configuration modes of the central processing unit 1201, which shall not be described herein any further.

In another implementation, the above apparatus 1100 and the central processing unit 1201 may be configured separately; for example, the apparatus 1100 may be configured as a chip connected to the central processing unit 1201, such as the system information acquiring unit shown in FIG. 12, and the functions of the apparatus 1100 are executed under control of the central processing unit 1201.

Furthermore, as shown in FIG. 12, the terminal equipment 1200 may include a communication module 1203, an input unit 1204, a display 1206, an audio processor 1205, an antenna 1207, and a power supply 1208, etc. Functions of the above components are similar to those in the related art, and shall not be described herein any further. It should be noted that the terminal equipment 1200 does not necessarily include all the parts shown in FIG. 12. Furthermore, the terminal equipment 1200 may include parts not shown in FIG. 12, and the related art may be referred to.

It can be seen from the above embodiment that the paging message and updated system information are transmitted on different BWPs, which may save signaling overhead of the system for transmitting the updated system information.

Embodiment 9

Embodiment 9 provides an apparatus for transmitting a system information indication. As a principle of the apparatus for solving problems is similar to that of the method in Embodiment 3, reference may be made to the implementation of the method in Embodiment 3 for implementation of the apparatus, with identical contents being not going to be described herein any further.

Figure 13:
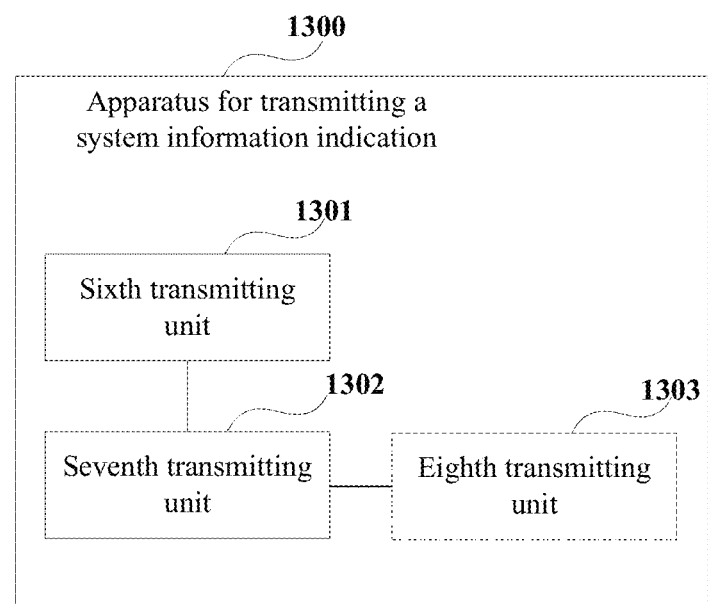
FIG. 13 is a schematic diagram of an apparatus for transmitting system information indication of Embodiment 9 of this disclosure.

FIG. 13 is a schematic diagram of the apparatus for transmitting a system information indication of Embodiment 9 of this disclosure. As shown in FIG. 13, an apparatus 1300 for transmitting a system information indication includes:

a sixth transmitting unit 1301 configured to transmit BWP configuration information to a terminal equipment, the BWP configuration information including information on at least one BWP configured for the terminal equipment; and a seventh transmitting unit 1302 configured to transmit indication information to the terminal equipment, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

In this embodiment, reference may be made to Embodiment 3 for particular implementations of the sixth transmitting unit 1301 and the seventh transmitting unit 1302, which shall not be described herein any further In this embodiment, the indication information may be transmitted via radio resource control signaling.

In this embodiment, the apparatus may further include:

an eighth transmitting unit 1303 (optional) configured to transmit updated system information to the terminal equipment on an active BWP of the at least one BWP.

In this embodiment, the updated system information may be transmitted via radio resource control signaling.

It can be seen from the above embodiment that the network device may notify the terminal equipment of whether there exists transmission of system information on a BWP of the at least one BWP configured for the terminal equipment or whether a paging message is received on a BWP of the at least one BWP, and according to the notification, the terminal equipment may determine not to receive a paging message when there is no transmission of system information on the active BWP, thereby saving overhead of signaling.

Embodiment 10

Embodiment 10 provides a network device. As a principle of the device for solving problems is similar to that of the method in Embodiment 3, reference may be made to the implementation of the method in Embodiment 3 for implementation of the device, with identical contents being not going to be described herein any further.

The embodiment of this disclosure further provides a network device (not shown), configured with the apparatus 1300 for transmitting a system information indication.

Figure 14:
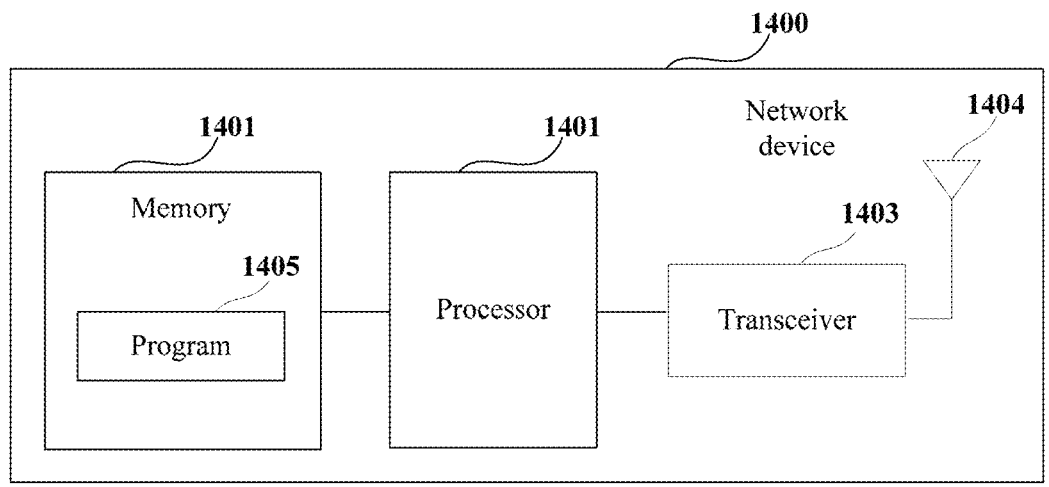
FIG. 14 is a schematic diagram of a structure of a network device of Embodiment 10 of this disclosure.

Embodiment 10 further provides a network device. As a principle of the device for solving problems is similar to that of the method in Embodiment 3, reference may be made to the implementation of the method in Embodiment 1 for implementation of the device, with identical contents being not going to be described herein any further. FIG. 14 is a schematic diagram of a structure of the network device. As shown in FIG. 14, a network device 1400 may include a central processing unit (CPU) 1401 and a memory 1402, the memory 1402 being coupled to the central processing unit 1401. The memory 1402 may store various data, and furthermore, it may store a program 1403 for data processing, and execute the program under control of the central processing unit 1401, to transmit a system information indication.

In one implementation, the functions of the apparatus 1300 may be integrated into the central processing unit 1401, wherein the central processing unit 1401 may be configured to carry out the method for transmitting system information indication described in Embodiment 3.

For example, the central processing unit 1401 may be configured to: transmit BWP configuration information to a terminal equipment, the BWP configuration information including information on at least one BWP configured for the terminal equipment; and transmit indication information to the terminal equipment, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

For example, the central processing unit 1401 may further be configured to: transmit updated system information to the terminal equipment on an active BWP of the at least one BWP.

Furthermore, reference may be made to Embodiment 3 for a particular configuration mode of the central processing unit 1401, which shall not be described herein any further.

In another implementation, the above apparatus 1300 and the central processing unit 1401 may be configured separately; for example, the apparatus 1300 may be configured as a chip connected to the central processing unit 1401, such as the units shown in FIG. 14, and the functions of the apparatus 1300 are executed under control of the central processing unit 1401.

Furthermore, as shown in FIG. 14, the network device 1400 may include a transceiver 1403, and an antenna 1404, etc. Functions of the above components are similar to those in the related art, and shall not be described herein any further. It should be noted that the network device 1400 does not necessarily include all the parts shown in FIG. 14. Furthermore, the network device 1400 may include parts not shown in FIG. 14, and the related art may be referred to.

It can be seen from the above embodiment that the network device may notify the terminal equipment of whether there exists transmission of system information on a BWP of the at least one BWP configured for the terminal equipment or whether a paging message is received on a BWP of the at least one BWP, and according to the notification, the terminal equipment may determine not to receive a paging message when there exists no transmission of system information on the active BWP, thereby saving overhead of signaling.

Embodiment 11

Embodiment 11 provides an apparatus for acquiring a system information indication. As a principle of the apparatus for solving problems is similar to that of the method in Embodiment 4, reference may be made to the implementation of the method in Embodiment 4 for implementation of the apparatus, with identical contents being not going to be described herein any further.

Figure 15:
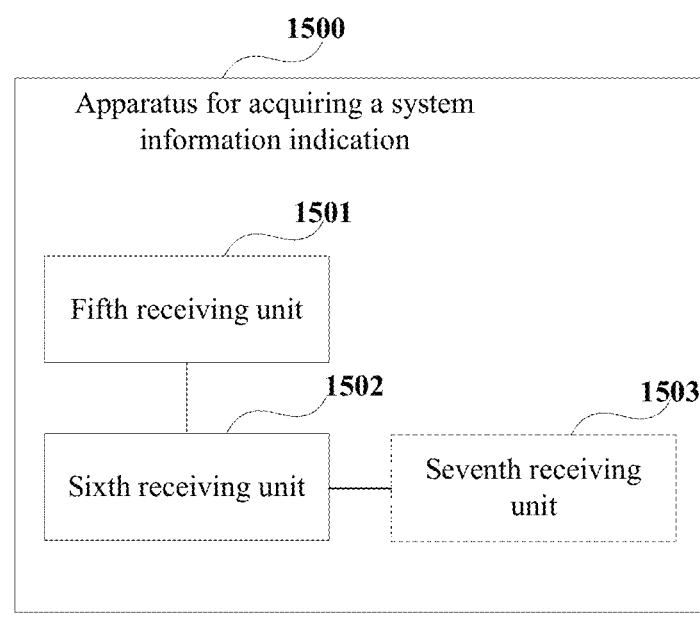
FIG. 15 is a schematic diagram of an apparatus for acquiring system information indication of Embodiment 11 of this disclosure.

FIG. 15 is a schematic diagram of the apparatus for acquiring a system information indication of Embodiment 11 of this disclosure. As shown in FIG. 15, an apparatus 1500 for acquiring a system information indication includes:

a fifth receiving unit 1501 configured to receive BWP configuration information transmitted by a network device, the BWP configuration information including information on at least one BWP configured by the network device for a terminal equipment; and a sixth receiving unit 1502 configured to receive indication information transmitted by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

In this embodiment, reference may be made to Embodiment 4 for particular implementations of the fifth receiving unit 1501 and the sixth receiving unit 1502, which shall not be described herein any further In this embodiment, the apparatus further includes:
a determining unit (optional, not shown) configured to determine that there exists transmission of system information on an active BWP or there exists no transmission of system information on an active BWP according to the indication information, or determine to receive a paging message or not to receive a paging message on an active BWP according to the indication information.

In this embodiment, the apparatus further includes:
a third processing unit (optional, not shown) configured to stop receiving a paging message transmitted by the network device when it is determined that there exists no transmission of system information or a paging message is not received on the active BWP.

In this embodiment, the apparatus further includes:
a seventh receiving unit 1503 (optional) configured to receive on an active BWP, updated system information transmitted by the network device.

In this embodiment, the apparatus further includes:
a storing unit (optional, not shown) configured to replace stored corresponding system information with the updated system information.

In this embodiment, the indication information may be received via radio resource control signaling, and/or the updated system information may be received via radio resource control signaling.

It can be seen from the above embodiment that the network device may notify the terminal equipment of whether there exists transmission of system information on a BWP of the at least one BWP configured for the terminal equipment or whether a paging message is received on a BWP of the at least one BWP, and according to the notification, the terminal equipment may determine not to receive a paging message when there exists no transmission of system information on the active BWP, thereby saving overhead of signaling.

Embodiment 12

The embodiment of this disclosure provides a terminal equipment. As a principle of the equipment for solving problems is similar to that of the method in Embodiment 4, reference may be made to the implementation of the method in Embodiment 4 for implementation of the device, with identical contents being not going to be described herein any further.

The embodiment of this disclosure further provides a terminal equipment (not shown), configured with the apparatus 1500 for acquiring a system information indication described above.

Figure 16:
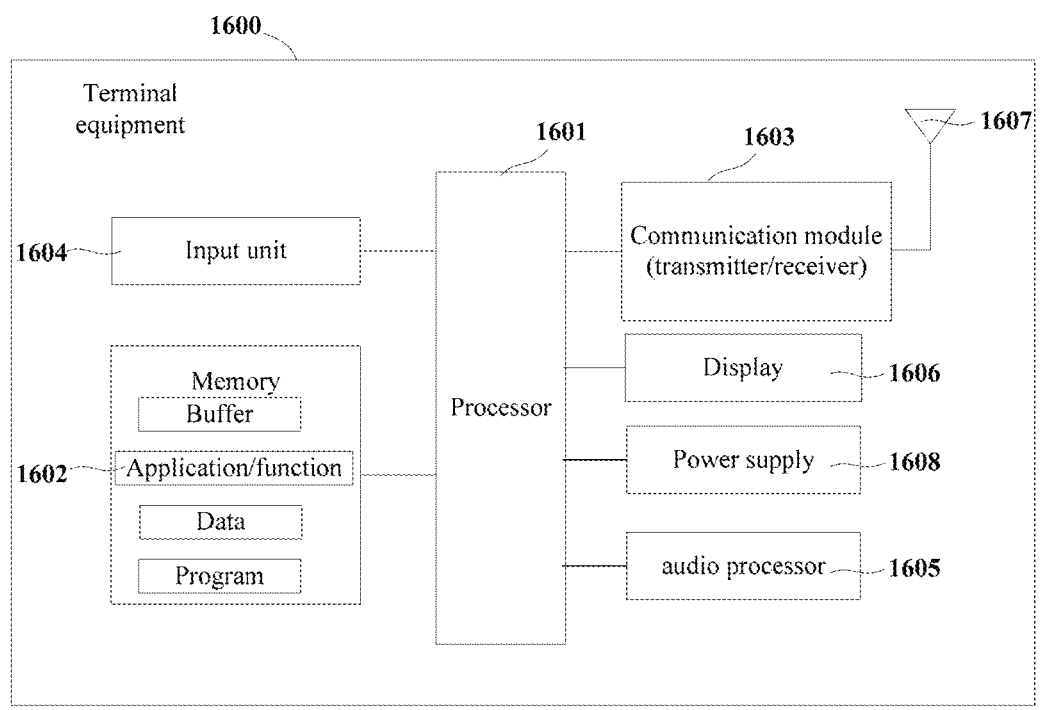
FIG. 16 is a schematic diagram of a structure of terminal equipment of Embodiment 12 of this disclosure.

This embodiment further provides a terminal equipment. FIG. 16 is a schematic diagram of a structure of the terminal equipment. As shown in FIG. 16, a terminal equipment 1600 may include a central processing unit (CPU) 1601 and a memory 1602, the memory 1602 being coupled to the central processing unit 1601. The memory 1602 may store various data, and furthermore, it may store a program for data processing, and execute the program under control of the central processing unit 1601, to acquire a system information indication.

In one implementation, the functions of the apparatus 1500 may be integrated into the central processing unit 1601, wherein the central processing unit 1601 may be configured to carry out the method for acquiring a system information indication described in Embodiment 4.

For example, the central processing unit 1601 may be configured to: receive BWP configuration information transmitted by a network device, the BWP configuration information including information on at least one BWP configured by the network device for a terminal equipment; and receive indication information transmitted by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

For example, the central processing unit 1601 may further be configured to: determine that there exists transmission of system information on an active BWP or there exists no transmission of system information on an active BWP according to the indication information, or determine to receive a paging message or not to receive a paging message on an active BWP according to the indication information.

For example, the central processing unit 1601 may further be configured to: stop receiving a paging message transmitted by the network device when it is determined that there exists no transmission of system information or a paging message is not received on the active BWP.

For example, the central processing unit 1601 may further be configured to: receive on an active BWP, updated system information transmitted by the network device.

For example, the central processing unit 1601 may further be configured to: replace stored corresponding system information with the updated system information.

In this embodiment, the indication information may be received via radio resource control signaling, and/or the updated system information may be received via radio resource control signaling.

Furthermore, reference may be made to Embodiment 4 for other configuration modes of the central processing unit 1601, which shall not be described herein any further.

In another implementation, the above apparatus 1500 and the central processing unit 1601 may be configured separately; for example, the apparatus 1500 may be configured as a chip connected to the central processing unit 1601, such as the system information indication acquiring unit shown in FIG. 16, and the functions of the apparatus 1500 are executed under control of the central processing unit 1601.

Furthermore, as shown in FIG. 16, the terminal equipment 1600 may include a communication module 1603, an input unit 1604, a display 1606, an audio processor 1605, an antenna 1607, and a power supply 1608, etc. Functions of the above components are similar to those in the related art, and shall not be described herein any further. It should be noted that the terminal equipment 1600 does not necessarily include all the parts shown in FIG. 16. Furthermore, the terminal equipment 1600 may include parts not shown in FIG. 16, and the related art may be referred to.

It can be seen from the above embodiment that the network device may notify the terminal equipment of whether there exists transmission of system information on a BWP of the at least one BWP configured for the terminal equipment or whether a paging message is received on a BWP of the at least one BWP, and according to the notification, the terminal equipment may determine not to receive a paging message when there exists no transmission of system information on the active BWP, thereby saving overhead of signaling.

Embodiment 13

Embodiment 13 provides a communication system, including the network device in Embodiment 9 and the terminal equipment in Embodiment 11, or including the network device in Embodiment 5 and the terminal equipment in Embodiment 7, the contents of which being incorporated herein, which shall not be described herein any further.

An embodiment of the present disclosure provides a computer readable program code, which, when executed in an apparatus for transmitting system information or a network device, will cause the apparatus for transmitting system information or the network device to carry out the method for transmitting system information as described in Embodiment 1.

An embodiment of the present disclosure provides a computer storage medium, including a computer readable program code, which will cause an apparatus for transmitting system information or a network device to carry out the method for transmitting system information as described in Embodiment 1.

An embodiment of the present disclosure provides a computer readable program code, which, when executed in an apparatus for acquiring system information or a terminal equipment, will cause the apparatus for acquiring system information or the terminal equipment to carry out the method for acquiring system information as described in Embodiment 2.

An embodiment of the present disclosure provides a computer storage medium, including a computer readable program code, which will cause an apparatus for acquiring system information or a terminal equipment to carry out the method for acquiring system information as described in Embodiment 2.

An embodiment of the present disclosure provides a computer readable program code, which, when executed in an apparatus for transmitting a system information indication or a network device, will cause the apparatus for transmitting a system information indication or the network device to carry out the method for transmitting a system information indication as described in Embodiment 3.

An embodiment of the present disclosure provides a computer storage medium, including a computer readable program code, which will cause an apparatus for transmitting a system information indication or a network device to carry out the method for transmitting a system information indication as described in Embodiment 3.

An embodiment of the present disclosure provides a computer readable program code, which, when executed in an apparatus for acquiring a system information indication or a terminal equipment, will cause the apparatus for acquiring a system information indication or the terminal equipment to carry out the method for acquiring a system information indication as described in Embodiment 4.

An embodiment of the present disclosure provides a computer storage medium, including a computer readable program code, which will cause an apparatus for acquiring a system information indication or a terminal equipment to carry out the method for acquiring a system information indication as described in Embodiment 4.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The system information method carried out in the system information apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 9-16 may either correspond to software modules of procedures of a computer program, or correspond to hardware modules. Such software modules may respectively correspond to the steps shown in FIGS. 2-8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 9-16 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 9-16 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A method for transmitting system information indication, including:

transmitting BWP configuration information to a terminal equipment by a network device, the BWP configuration information including information on at least one BWP configured for the terminal equipment; and transmitting indication information to the terminal equipment by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

Supplement 2. The method according to supplement 1, wherein the indication information is transmitted via radio resource control signaling.

Supplement 3. The method according to supplement 1, wherein the method further includes:

transmitting updated system information by the network device to the terminal equipment on an active BWP of the at least one BWP.

Supplement 4. The method according to supplement 3, wherein the updated system information is transmitted via radio resource control signaling.

Supplement 5. A method for acquiring system information indication, including:

receiving BWP configuration information transmitted by a network device, the BWP configuration information including information on at least one BWP configured by the network device for a terminal equipment; and receiving indication information transmitted by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

Supplement 6. The method according to supplement 5, wherein the method further includes:

determining that there exists transmission of system information on an active BWP or there exists no transmission of system information on an active BWP according to the indication information, or determining to receive a paging message or not receive a paging message on an active BWP according to the indication information, by the terminal equipment.

Supplement 7. The method according to supplement 6, wherein the method further includes:

stopping, by the terminal equipment, receiving a paging message transmitted by the network device, when it is determined that there exists no transmission of system information on the active BWP or not receiving a paging message on the active BWP.

Supplement 8. The method according to supplement 6, wherein the method further includes:

receiving, on an active BWP when the system information is modified, updated system information transmitted by the network device.

Supplement 9. The method according to supplement 8, wherein the method further includes:

replacing stored corresponding system information with the updated system information.

Supplement 10. The method according to supplement 6, wherein the indication information is received via radio resource control signaling, and/or the updated system information is received via radio resource control signaling.

Supplement 11. An apparatus for transmitting a system information indication, wherein the apparatus includes:

a sixth transmitting unit configured to transmit BWP configuration information to a terminal equipment, the BWP configuration information including information on at least one BWP configured for the terminal equipment; and a seventh transmitting unit configured to transmit indication information to the terminal equipment, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

Supplement 12. The apparatus according to supplement 11, wherein the indication information is transmitted via radio resource control signaling.

Supplement 13. The apparatus according to supplement 11, wherein the apparatus further includes:

an eighth transmitting unit configured to transmit updated system information to the terminal equipment on an active BWP of the at least one BWP.

Supplement 14. The apparatus according to supplement 13, wherein the updated system information is transmitted via radio resource control signaling.

Supplement 15. An apparatus for acquiring a system information indication, wherein the apparatus includes:

a fifth receiving unit configured to receive BWP configuration information transmitted by a network device, the BWP configuration information including information on at least one BWP configured by the network device for a terminal equipment; and a sixth receiving unit configured to receive indication information transmitted by the network device, the indication information being used to indicate that there exists transmission of system information or there exists no transmission of system information on a BWP of the at least one BWP, or the indication information being used to indicate that the terminal equipment receives a paging message or does not receive a paging message on a BWP of the at least one BWP.

Supplement 16. The apparatus according to supplement 15, wherein the apparatus further includes:

a determining unit configured to determine that there exists transmission of system information on an active BWP or there exists no transmission of system information on an active BWP according to the indication information, or determine to receive a paging message or not to receive a paging message on an active BWP according to the indication information.

Supplement 17. The apparatus according to supplement 16, wherein the apparatus further includes:

a third processing unit configured to stop receiving a paging message transmitted by the network device when it is determined that there exists no transmission of system information on the active BWP or a paging message is not received on the active BWP.

Supplement 18. The apparatus according to supplement 16, wherein the apparatus further includes:

a seventh receiving unit configured to, when the system information is modified, receive on an active BWP, updated system information transmitted by the network device.

Supplement 19. The apparatus according to supplement 18, wherein the apparatus further includes:

a storing unit configured to replace stored corresponding system information with the updated system information.

Supplement 20. The apparatus according to supplement 16, wherein the indication information is received via radio resource control signaling, and/or the updated system information is received via radio resource control signaling.

Supplement 21. A method for transmitting system information, wherein the method includes:

transmitting a paging message on a first BWP, the paging message including indication information indicating a system information modification; and transmitting updated system information on a second BWP;

wherein, the first BWP is different from the second BWP.

Supplement 22. The method according to supplement 21, wherein the method further includes:

transmitting first indication information by the network device to a terminal equipment, the first indication information being used to indicate the second BWP to the terminal equipment.

Supplement 23. The method according to supplement 21, wherein the method further includes:

receiving a first message transmitted by the terminal equipment, the first message being used to indicate the second BWP.

Supplement 24. The method according to supplement 21, wherein the method further includes:

receiving a second message transmitted by the terminal equipment, the second message being used to indicate that the terminal equipment switches to the second BWP or the terminal equipment activates the second BWP.

Supplement 25. The method according to supplement 21, wherein the method further includes: transmitting data on the second BWP by the network device.

Supplement 26. The method according to supplement 21, wherein the paging message is further used to indicate that the terminal equipment receives the updated system information after a predetermined period of time.

Supplement 27. The method according to supplement 26, wherein the predetermined period of time is indicated by the paging message, or the predetermined period of time is predefined or preconfigured.

Supplement 28. The method according to supplement 26, wherein the paging message is further used to indicate that the terminal equipment switches to the second BWP or actives the second BWP after the predetermined period of time and receives the updated system information on the second BWP.

Supplement 29. The method according to supplement 27, wherein the predetermined period of time contained in the paging message is different from or identical to a predetermined period of time contained in a paging message transmitted on at least one other BWP.

Supplement 30. The method according to supplement 21, wherein the method further includes:

transmitting terminal equipment gap configuration information to the terminal equipment, the gap configuration information including at least one of the following: a period of the gap, an offset of the gap and a duration of the gap, the gap being used for the terminal equipment in switching to the second BWP or activating the second BWP during the gap.

Supplement 31. A method for acquiring system information, wherein the method includes:

receiving a paging message on a first BWP, the paging message including indication information indicating a system information modification; and receiving updated system information on a second BWP;

wherein, the first BWP is different from the second BWP.

Supplement 32. The method according to supplement 31, wherein the method further includes:

switching from the first BWP to the second BWP, or switching from a third BWP receiving data to the second BWP, or activating the second BWP, when a predetermined triggering condition is satisfied.

Supplement 33. The method according to supplement 32, wherein the terminal equipment receives the updated system information on the second BWP after switching to the second BWP or activating the second BWP.

Supplement 34. The method according to supplement 31, wherein the method further includes: determining the second BWP, including determining by the terminal equipment a second BWP to be used from at least two second BWPs used by a network device in transmitting updated system information; or receiving by the terminal equipment first indication information transmitted by the network device, the first indication information being used to indicate the second BWP to the terminal equipment, and the terminal equipment determines the second BWP to be used according to the first indication information.

Supplement 35. The method according to supplement 32, wherein after the system information is received on the second BWP, the method further includes:
  modifying an active BWP into the first BWP or the third BWP or deactivating the second BWP; or
  modifying an active BWP into the first BWP or the third BWP or deactivating the second BWP, when a gap configured by the network device comes to an end; or
  modifying an active BWP into the first BWP or the third BWP or deactivating the second BWP, at a boundary of a next modification period of the system information; or
    staying on the second BWP; or
    deactivating the second BWP after indication is received from the network device or a BWP timer expires.

Supplement 36. The method according to any one of supplements 31-34, wherein the predetermined triggering condition includes:
  a time when the paging message is received; or
  a time when the paging message is received and at a boundary where a next modification period of the system information comes; or
  a time when the paging message is received and the paging message further indicates that the terminal equipment receives updated system information after a predetermined period of time; or
  a time when the paging message is received and after a BWP timer expires; or
  a time when the paging message is received and during a gap configured for UE by the network device.

Supplement 37. The method according to supplement 36, wherein when the paging message includes a notification message indicating that the system information is ETWS/CMAS, the predetermined triggering condition is the time when the paging message is received.

Supplement 38. The method according to supplement 36, wherein the terminal equipment selects the predetermined period of time from at least one predetermined period when the predetermined triggering condition is the time when the paging message is received and the paging message further indicates that the terminal equipment receives the updated system information after the predetermined period of time and the terminal equipment has information on one or at least two predetermined periods of time.

Supplement 39. The method according to supplement 36, wherein when the predetermined condition is the time when the paging message is received and during a gap configured for UE by the network device, the method further includes:
  receiving gap configuration information transmitted by the network device, the gap configuration information including at least one of the following: a period of the gap, an offset of the gap, and a duration of the gap.

Supplement 40. The method according to supplement 31, wherein the method further includes:
  transmitting a first message to the network device, the first message being used to indicate the second BWP; and/or
  transmitting a second message to the network device, the second message being used to indicate that the terminal equipment switches to the second BWP or the terminal equipment activates the second BWP.

What is claimed is:

1. A method for transmitting system information indication, comprising:
  transmitting BWP configuration information and indication information to a terminal equipment by a network device, the BWP configuration information comprising information on at least one BWP configured for the terminal equipment, the indication information being used to indicate that there exists system information to be received by the terminal equipment or there exists no system information to be received by the terminal equipment on a BWP of the at least one BWP,
    wherein, when the indication information includes related information, the indication information indicates that there exists system information to be received by the terminal equipment on a BWP of the at least one BWP, and
    when the indication information does not include the related information, the indication information indicates that there exists no system information to be received by the terminal equipment on a BWP of the at least one BWP;
  transmitting an activated indication information being used to indicate an activated BWP of the at least one BWP; and
  transmitting updated system information by the network device to the terminal equipment on the activated BWP in the at least one BWP, when there exists no system information broadcast in the activated BWP.

2. The method according to claim 1, wherein the indication information is transmitted via radio resource control signaling.

3. The method according to claim 1, wherein the updated system information is transmitted via radio resource control signaling.

4. The method according to claim 1, wherein indication information further being used to indicate that the terminal equipment receives a paging message or does not receive a paging message on a BWP of the at least one BWP.

5. A network device, comprising:
  a memory that stores a plurality of instructions; and
  a processor coupled to the memory and configured to execute the instructions to:
  transmit BWP configuration information and indication information to a terminal equipment, the BWP configuration information comprising information on at least one BWP configured for the terminal equipment, the indication information being used to indicate that there exists system information to be received by the terminal equipment or there exists no system information to be received by the terminal equipment on a BWP of the at least one BWP,
    wherein, when the indication information includes related information, the indication information indicates that there exists system information to be received by the terminal equipment on a BWP of the at least one BWP, and
    when the indication information does not include the related information, the indication information indicates that there exists no system information to be received by the terminal equipment on a BWP of the at least one BWP;
  transmit an activated indication information being used to indicate an activated BWP of the at least one BWP; and
  transmit updated system information to the terminal equipment on the activated BWP in the at least one BWP, when there exists no system information broadcast in the activated BWP.

6. The network device according to claim 5, wherein the indication information is transmitted via radio resource control signaling.

7. The network device according to claim 5, wherein the updated system information is transmitted via radio resource control signaling.

8. The network device according to claim 5, wherein indication information further being used to indicate that the terminal equipment receives a paging message or does not receive a paging message on a BWP of the at least one BWP.

9. A terminal equipment, comprising:
a memory that stores a plurality of instructions; and
a processor coupled to the memory and configured to execute the instructions to:
receive a BWP configuration information and indication information transmitted by a network device, the BWP configuration information comprising information on at least one BWP configured by the network device for the terminal equipment, the indication information being used to indicate that there exists system information to be received by the terminal equipment or there exists no system information to be received by the terminal equipment on a BWP of the at least one BWP,
wherein, when the indication information includes related information, the indication information indicates that there exists system information to be received by the terminal equipment on a BWP of the at least one BWP, and
when the indication information does not include the related information, the indication information indicates that there exists no system information to be received by the terminal equipment on a BWP of the at least one BWP;
receive an activated indication information being used to indicate an activated BWP of the at least one BWP; and
receive updated system information transmitted by the network device on the activated BWP in the at least one BWP when the system information is changed and there exists no system information broadcast in the activated BWP.

10. The terminal equipment according to claim 9, wherein indication information further being used to indicate that the terminal equipment receives a paging message or does not receive a paging message on a BWP of the at least one BWP.

11. The terminal equipment according to claim 9, wherein the processor determines that there exists system information to be received by the terminal equipment on an activated BWP or there exists no system information to be received by the terminal equipment on an activated BWP according to the indication information.

12. The terminal equipment according to claim 10 wherein the processor determines that receiving a paging message or not receiving a paging message on an activated BWP according to the indication information.

13. The terminal equipment according to claim 9, wherein the processor stops receiving a paging message transmitted by the network device, when it is determined that there exists no system information to be received by the terminal equipment.

14. The terminal equipment according to claim 10, wherein the processor stops receiving a paging message transmitted by the network device, when it is determined that not receiving a paging message on the activated BWP.

15. The terminal equipment according to claim 9, wherein the processor replaces stored corresponding system information with the updated system information.

16. The terminal equipment according to claim 9, wherein the indication information is received via radio resource control signaling, and/or updated system information is received via radio resource control signaling.

* * * * *